US007151832B1

(12) United States Patent
Fetkovich et al.

(10) Patent No.: US 7,151,832 B1
(45) Date of Patent: Dec. 19, 2006

(54) DYNAMIC ENCRYPTION AND DECRYPTION OF A STREAM OF DATA

(75) Inventors: John Edward Fetkovich, Endicott, NY (US); Wai Man Lam, Moheganlake, NY (US); George William Wilhelm, Jr., Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 09/443,204

(22) Filed: Nov. 18, 1999

(51) Int. Cl.
*H04L 9/16* (2006.01)
*H04N 7/167* (2006.01)
*H04L 9/00* (2006.01)

(52) U.S. Cl. .................. 380/210; 380/260; 725/31
(58) Field of Classification Search ............. 380/210, 380/160; 725/31
See application file for complete search history.

(56) References Cited

U.S. PATENT DOCUMENTS

| | | | |
|---|---|---|---|
| 4,747,050 A | 5/1988 | Brachtl et al. ............. 364/408 |
| 5,412,730 A * | 5/1995 | Jones ......................... 380/46 |
| 5,416,840 A | 5/1995 | Cane et al. .................... 380/4 |
| 5,504,816 A | 4/1996 | Hamilton et al. ............ 380/20 |
| 5,638,445 A | 6/1997 | Spelman et al. ............. 380/21 |
| 5,719,937 A * | 2/1998 | Warren et al. ............. 380/203 |
| 5,787,169 A | 7/1998 | Eldridge et al. .............. 380/4 |
| 5,805,700 A * | 9/1998 | Nardone et al. ............ 380/217 |
| 5,933,501 A * | 8/1999 | Leppek ........................ 380/259 |
| 5,991,403 A * | 11/1999 | Aucsmith et al. ........... 380/217 |
| 6,157,719 A * | 12/2000 | Wasilewski et al. ........ 380/210 |

OTHER PUBLICATIONS

Chiariglione, Leonardo; "Digital Television Achieves Maturity"; copyrighted 1998, pp. 2-3.*

* cited by examiner

*Primary Examiner*—Jacques Louis-Jacques
*Assistant Examiner*—Matthew Heneghan
(74) *Attorney, Agent, or Firm*—William H. Steinberg, Esq.; Kevin P. Radigan, Esq.; Heslin Rothenberg Farley & Mesiti, P.C.

(57) ABSTRACT

Dynamic varying of encrypting of a stream of data at an encryption unit based on data content is disclosed. The dynamic varying of the encrypting, which can be responsive to passage of a predefined number of units of physical data or passage of a predefined number of conceptual units of data, is accomplished by changing at least one encryption parameter over different portions of the data. The at least one encryption parameter can comprise one or more of an encryption key, an encryption granularity, an encryption density scale, an encryption density, an encryption delay, an encryption key update variable, and an encryption key update data trigger. The change in encryption parameter is signaled to a receiver's decryption unit and used by the decryption unit in decrypting the dynamically varied encrypted stream of data. The stream of data may comprise, e.g., MPEG compressed video or audio.

24 Claims, 2 Drawing Sheets

DYNAMIC ENCRYPTION AND DECRYPTION OF A STREAM OF DATA

CROSS-REFERENCE TO RELATED APPLICATION

This application is related to commonly assigned, co-pending patent application Ser. No. 08/881,139, filed Jun. 24, 1997 by Ciacelli et al. and entitled "Apparatus, Method And Computer Program Product For Protecting Copyright Data Within A Computer System," which is hereby incorporated herein by reference in its entirety.

TECHNICAL FIELD

The present invention is directed in general to protection of digital data and, more particularly, to techniques for dynamically encrypting and decrypting compressed digital video or audio for secure digital transmission of the data.

BACKGROUND OF THE INVENTION

The advent of world-wide electronic communications systems has enhanced the way in which people can send and receive information. For example, the capabilities of real-time video and audio systems have greatly improved in recent years. In order to provide services such as video-on-demand, video conferencing, and motion picture playback, to name but a few, an enormous amount of bandwidth is required. In fact, bandwidth is often the main inhibitor in the effectiveness of such systems.

In order to overcome the constraints imposed by existing technology, compression systems have emerged. These-systems reduce the amount of video and audio data which must be transmitted by removing redundancy in the picture sequence. At the receiving end, the picture sequence is uncompressed and may be displayed in real time.

One example of a video compression standard is the Moving Picture Expert's Group (MPEG) standard. Within the MPEG standard (known as ISO/IEC 13818), video compression is defined within a picture and between pictures. Video compression within a picture is accomplished by conversion of the digital image from the time domain to the frequency domain by a discrete cosine transform, quantization, variable length coding, and Huffman coding. Compression between pictures is accomplished by a process referred as "motion estimation", in which a motion vector plus difference data is used to describe the translation of a set of picture elements from one picture to another. The ISO MPEG2 standard specifies only the syntax of a bit stream and semantics of the decode process. The particular choice of coding parameters and trade-offs in performance versus complexity are left to the system developers.

There is substantial interest in the computer and entertainment industries in incorporating video data in multimedia and related applications for use on processor-based video systems. Potential growth in this area has been enabled by development of video compression schemes, such as the above-summarized MPEG standard that reduce the amount of digital data required to display high quality video images, and by the development of storage media, such as digital video discs (DVDs) which can accommodate data in compressed form for an entire movie on a single compact disc. With the compressed data of an entire movie readily available on a single compact disc, content providers are naturally concerned with the possibility of unauthorized copying, and thus, desire to encrypt the compressed data wherever it may be available.

As digital transmissions (and storage) become more prevalent, the security of these transmissions becomes more important. The owners and distributors of any digital signal, such as a video conferencing signal or a direct-satellite transmission, may wish the signal to be unintelligible to unauthorized parties. A digital transmission of video (such as MPEG compressed data) can be protected by encrypting the data. Various encryption techniques exist in the literature for protecting a data stream. Decryption of the stream is then performed on the receiving end. Encryption and decryption might depend on a numerical key. Such a scheme, depending on the thoroughness of the encryption, may be secure for a time, but the stream is still susceptible to being intercepted and reverse engineered.

Thus, a more secure approach to encrypting a digital transmission, either within a system or between systems is deemed desirable.

DISCLOSURE OF THE INVENTION

To briefly summarize, provided herein in one aspect is a method for protecting a stream of data to be transferred between an encryption unit and a decryption unit. The method includes: encrypting the stream of data at the encryption unit for transfer thereof from the encryption unit to the decryption unit; dynamically varying the encrypting of the stream of data at the encryption unit by changing at least one encryption parameter and signaling the change in encryption parameter to the decryption unit, wherein the dynamically varying is responsive to occurrence of a predefined condition in the stream of data; and decrypting the encrypted data at the decryption unit, the decrypting accounting for the dynamic varying of the encrypting by the encryption unit using the changed encryption parameter. In an enhanced embodiment, changing of the encryption parameter to accomplish the dynamically varying includes changing at least one of an encryption key, an encryption granularity, an encryption density scale, an encryption density, an encryption delay, an encryption key update variable, and an encryption key update data trigger.

In another aspect, a system for protecting a stream of data is provided which includes an encryption unit for encrypting the stream of data for transfer to a decryption unit, as well as means for dynamically varying the encrypting of the stream of data by the encryption unit by changing at least one encryption parameter and signaling the change to the decryption unit. The means for dynamically varying the encrypting of the stream is responsive to occurrence of a predefined condition in the stream of data. The decryption unit is adapted to decrypt the encrypted data accounting for the dynamic varying of the encrypting by the encryption unit using the changed encryption parameter.

In a further aspect, provided herein is at least one program storage device readable by a machine, tangibly embodying at least one program of instructions executable by the machine to perform a method for protecting a stream of data to be transferred between an encryption unit and a decryption unit. The method includes: encrypting the stream of data at the encryption unit for transfer thereof to the decryption unit; dynamically varying the encrypting of the stream of data at the encryption unit by changing an encryption parameter and signaling the change in encryption parameter to the decryption unit, wherein the dynamically varying is responsive to occurrence of a predefined condition in the stream of data; and decrypting the encrypted data at the decryption unit, the decrypting accounting for the dynamic varying of the encrypting by the encryption unit using the changed encryption parameter.

To restate, provided herein is a technique for more securely encrypting a stream of digital data for transmission using a relatively small, yet flexible set of encryption parameters. The set of encryption parameters is employed to dynamically vary the encryption of the stream of data, such as a stream of MPEG compressed data. The set of encryption parameters may comprise one or more of an encryption key, an encryption granularity, an encryption density scale, an encryption density, an encryption delay, an encryption key update variable, and an encryption key update data trigger. The encryption parameter set employed is easily extensible.

In addition to enhancing security of a digital transmission, dynamic encryption in accordance with the present invention allows for only partial encryption of the data stream, which is especially useful for video and audio data since the stream can be rendered almost impossible to comfortably view or listen to by encrypting relatively small fractions of the overall data. Further, the ability to partially encrypt a transmission allows a system to control the amount of resources, for example, CPU cycles if the encryption or decryption is performed by software, used in the encryption or decryption of a data stream. And, "overhead" of transmitting encryption parameters may be controlled by updating the one or more parameters less frequently if bandwidth is a concern. By providing an encryption parameter set, different levels of "thoroughness" can be achieved in encrypting the data. For example, where a digital data transmission is of high priority, a large percentage of the transmission may be encrypted, and further, the encryption key (or other encryption parameter) may be changed frequently with the content of the data. If desired, encryption parameters may be multiplexed (i.e., joined) with the actual payload data when transmitted. In addition to helping to disguise the fact that the data is encrypted, no additional data paths for transmission of the encryption parameters would be required in such an implementation.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
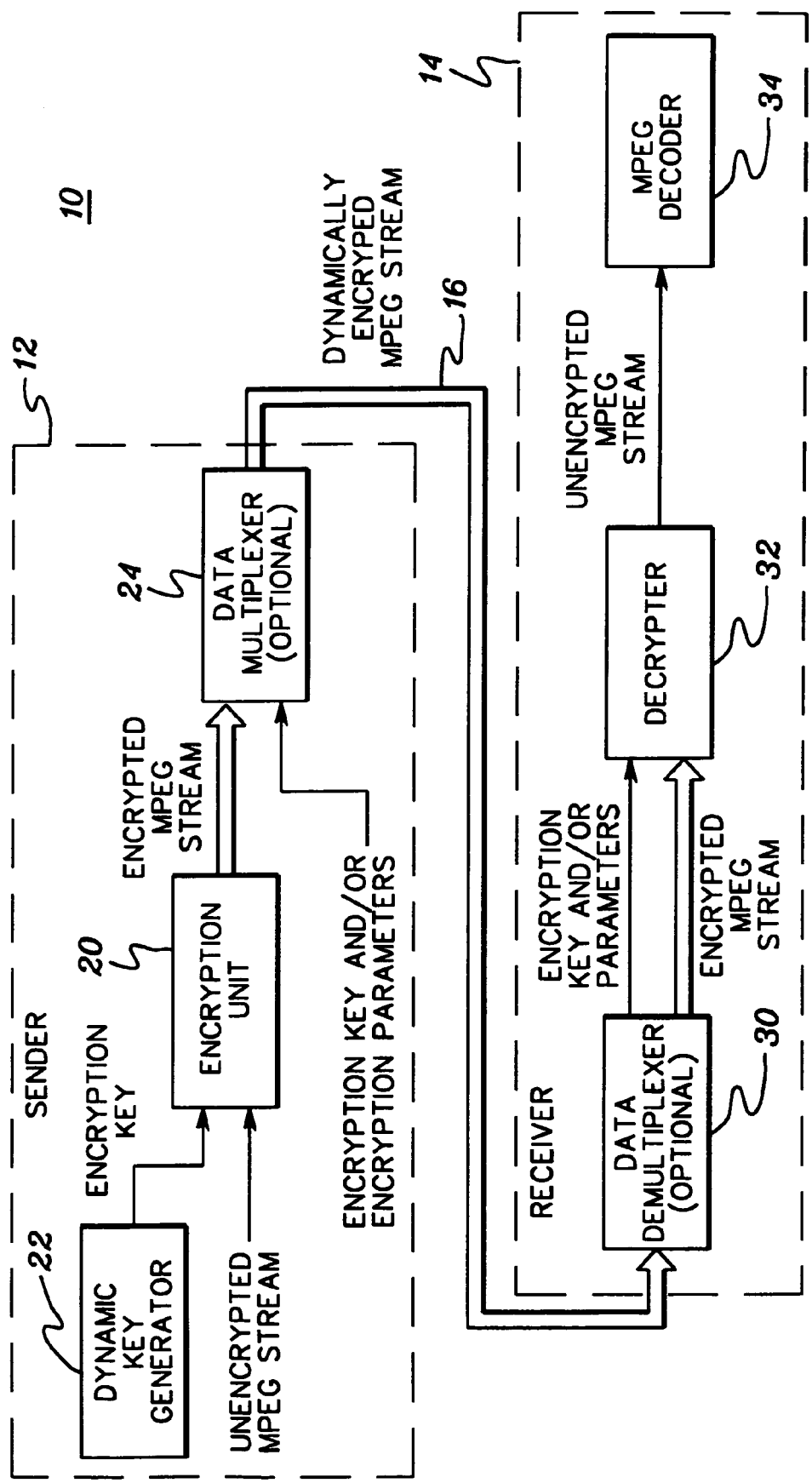
FIG. 1 depicts one embodiment of a system employing dynamic encryption and decryption in accordance with the principles of the present invention.

Generally stated, presented herein is a more secure method to encrypt a digital transmission by varying one or more encryption parameters over different portions the stream of data. At certain data intervals, the encryption scheme is changed, or more particularly, an encryption parameter such as an encryption key is modified. A next key in an evolving sequence of keys might be transmitted explicitly in the data stream by inserting it into the stream or the key might be hidden in some unused bits in the stream. Alternatively, a predetermined transformation might be applied to the encryption parameter, for example, by incrementing it, or running the parameter through a hardware circuit.

A change in encryption method or encryption parameter may be signaled by an external signal, or the presence of something within the stream itself, or the occurrence of a pre-specified number of events. For example, an encryption key might be altered based on a certain number of bits or bytes that have been transmitted and received, or based on a certain number of structures having been transmitted and received. Using an MPEG video data stream, this might mean that after a certain number of macroblocks, slices, fields, frames, pictures, groups of pictures (GOPs), or sequences have been sent and received, an encryption parameter (such as an encryption key) is automatically updated. Many digital compression schemes allow for the inclusion of timing information (i.e., timestamps), often used for synchronization purposes.

Another scheme might be that sender and receiver change their encryption scheme, or update encryption keys, based upon timestamps passing certain prespecified thresholds, or upon passing certain thresholds as designated by an external clock to which both sender and receiver have access. Recognition of signals indicating that the encryption scheme or key should be updated can be performed by dedicated hardware, or by software running on a host processor, as will be apparent to those skilled in the art.

In addition to dynamically encrypting a digital transmission, such as an MPEG video stream, encryption in accordance with the present invention can be partial or complete depending upon the importance of the data itself. For example, MPEG video consists of several "layers" of data, the largest of these might be an entire program, such as a movie, video-phone transmission, etc., and the smallest a macroblock of data. From the largest to the smallest, an MPEG stream can be described as including the following units: program, sequence, group of pictures (GOPs), picture, slice, and macroblock. Thus, in accordance with the principles of the present invention, the dynamic encrypting can occur at any one of these levels. Obviously, the amount of bandwidth required may vary with the level of encryption selected.

In addition, the MPEG standard allows for several optional types of "private" data, allows for many optional fields and extensions, and contains routine audio/video synchronization data known as "timestamps" (for example, presentation timestamps and decoding timestamps). Furthermore, MPEG streams are commonly divided and packaged into discrete packets known as "transport" packets, which may be joined to create a transport stream. The transport stream architecture also allows for private data transmissions, and allows for optional fields and contains timestamp data as well. Any of these types of private data could be employed in forwarding a dynamically modified encryption parameter from a sender to a receiver in a system employing the dynamic encrypting of the present invention.

Advantageously, dynamic encryption as presented herein provides a more secure transmission of data, while still being flexible. For example, an MPEG stream may be transmitted using varying levels of encryption depending upon the sensitivity of the video material. A highly sensitive conference call, therefore, might be fully or almost fully encrypted, while a public access program, or a non-confidential phone call might have a relatively low degree of encryption. Particularly where encryption and/or decryption involves software, the present invention allows the number of processor cycles needed for the encryption/decryption to be controlled.

Note that a compressed audio stream (for example, MPEG audio, Dolby AC-3 audio, etc.) can be treated analogously to video as pertains to the use of the present invention. An audio stream might be said to consist of, from largest to smallest units, a program, a frame, and a sample.

As one detailed example, dynamic encryption in accordance with the present invention may involve a set encryption parameters which includes:

Initial Encryption Key

This might be a key agreed upon in advance by the encryption and decryption units. Alternatively, the key might be randomly chosen then transmitted independently of the stream, or multiplexed into the stream, using private data packets or one or more fields of unused or reserved bits according to the MPEG architecture. Further, some portion of the stream itself might serve as the initial key, with data beginning at, for example, some fixed offset of the payload, or the offset itself could be transmitted. The initial key, if transmitted more than once, may be accompanied by "dummy" data designed to mislead an unauthorized observer attempting to decrypt the transmission. The initial key might itself be encrypted, and need to be decrypted before use.

Granularity

Granularity refers to the sub-units of MPEG data which are to be encrypted (also referred to herein as the "encryption units" or "units of encryption"). As mentioned above, a set of granularities for MPEG video data might be: program, sequence, group of pictures, picture, slice, and macroblock. Once again, the granularity might be transmitted independently of the stream, or multiplexed into the stream, either as "private" data, or embedded in one or more unused MPEG fields.

Density Scale

This is a number which will denote 100% encryption of encryption units. For example, suppose the density scale is 1024. Then a density (see below) of 1024 would indicate 100% encryption. A density of less than 1024 indicates that not all encryption units are to be encrypted. The density scale may be transmitted in any of the manners described above, or simply agreed upon in advance.

Density

This refers to the fraction of the total units of encryption which will be encrypted. This might be communicated in terms of a predefined scale; for example, the number 1024 might indicate 100% encryption. Then a density of 512 would imply that every other encryption unit is to be encrypted. Similarly, a density of 1 would indicate that only one encryption unit out of each group of 1024 encryption units is to be encrypted. The density may be transmitted in any of the manners described above.

Delay

This refers to the number of encryption units to wait before encrypting the first one. This number is zero-origin.

Key Update Unit

This refers to the unit which is to be tabulated in order to determine when the encryption key is to be updated. This unit might be one of the granularities described above (picture, slice, etc.). For example, the key is to be updated every n slices. Alternatively, the key update unit might be bytes of data, for instance, the key is to be updated every n bytes of transmission, or the key update unit might be seconds (or milliseconds, etc.).

Key Update Data Trigger

This refers to the data interval at which the key is to be refreshed. As noted above, The key might be newly transmitted, independently of the stream, or multiplexed into it. Alternatively, the existing key may be operated on in some fashion, for example, to clock it through a linear feedback shift register (LFSR), or to add a delta to the existing key. Further, the key might be newly acquired from the payload of the stream itself, at some predetermined offset, or at some communicated offset. In the case in which the key update unit is, for example, a number of milliseconds, the stream's timestamps may be examined, and the key updated at any picture whose timestamp indicates that the key update interval has been reached.

Any of the parameters described above may have default values, in which case they do not need to be established explicitly. The parameters may be communicated separately, or combined into one number before transmission. Dynamically encrypting in accordance with the present invention can easily be extended to dynamically changing encryption parameters other than the encryption key.

As one specific example, the following encryption parameters may be established:

granularity=slice
density sale=1024
density=256
delay=1
key update unit=picture
key update frequency=16

These parameters imply the following. The unit which will be encrypted is the picture slice. One fourth of the slices (256/1024) (i.e., every fourth slice) will be encrypted. Further, the first slice will be unencrypted; encryption will begin with the second slice (delay of 1) and continue with every fourth slice thereafter. The encryption key, after having been initialized, will be updated at the start of every sixteenth picture (key update frequency).

Refer now to FIG. 1, where one example of a system, generally denoted 10, incorporating dynamic encryption in accordance with the principles of the present invention is depicted. System 10 includes a sender 12 and a receiver 14. Dynamically encrypted data is transmitted between sender and receiver across any conventional transmission medium 16. In this example, the data to be encrypted is assumed to comprise a stream of MPEG data.

Sender 12 includes an encryption unit 20 which (in this example) receives as inputs an encryption key from a dynamic key generator 22, and the unencrypted, but encoded MPEG data stream. Any conventional encryption technique can be employed within encryption unit 20, provided that the encryption can be modified dynamically as presented herein by changing an encryption key or one or more other encryption parameters as discussed above. Output from encryption unit 20 is an encrypted MPEG stream. In this example, the encrypted MPEG stream is fed to a data multiplexer 24 which multiplexes into the stream the encryption key employed to encrypt the stream and the encryption parameters employed by the encryption unit. Data multiplexer 24 is optional since the encryption key and encryption parameters could be forwarded independent from the encrypted stream of data, for example, on a dedicated line (not shown) to the receiver 14.

Receiver 14 receives the dynamically encrypted stream of data at a data demultiplexer 30, which again assumes that the encryption key or encryption parameters have been multiplexed into the stream. Output from demultiplexer 30 is the encryption key and/or parameters, as well as the encrypted MPEG stream. This data is forwarded to a decryption unit 32 which then decrypts the data using the encryption information and provides an unencrypted MPEG stream to a conventional MPEG decoder 34.

Figure 2:
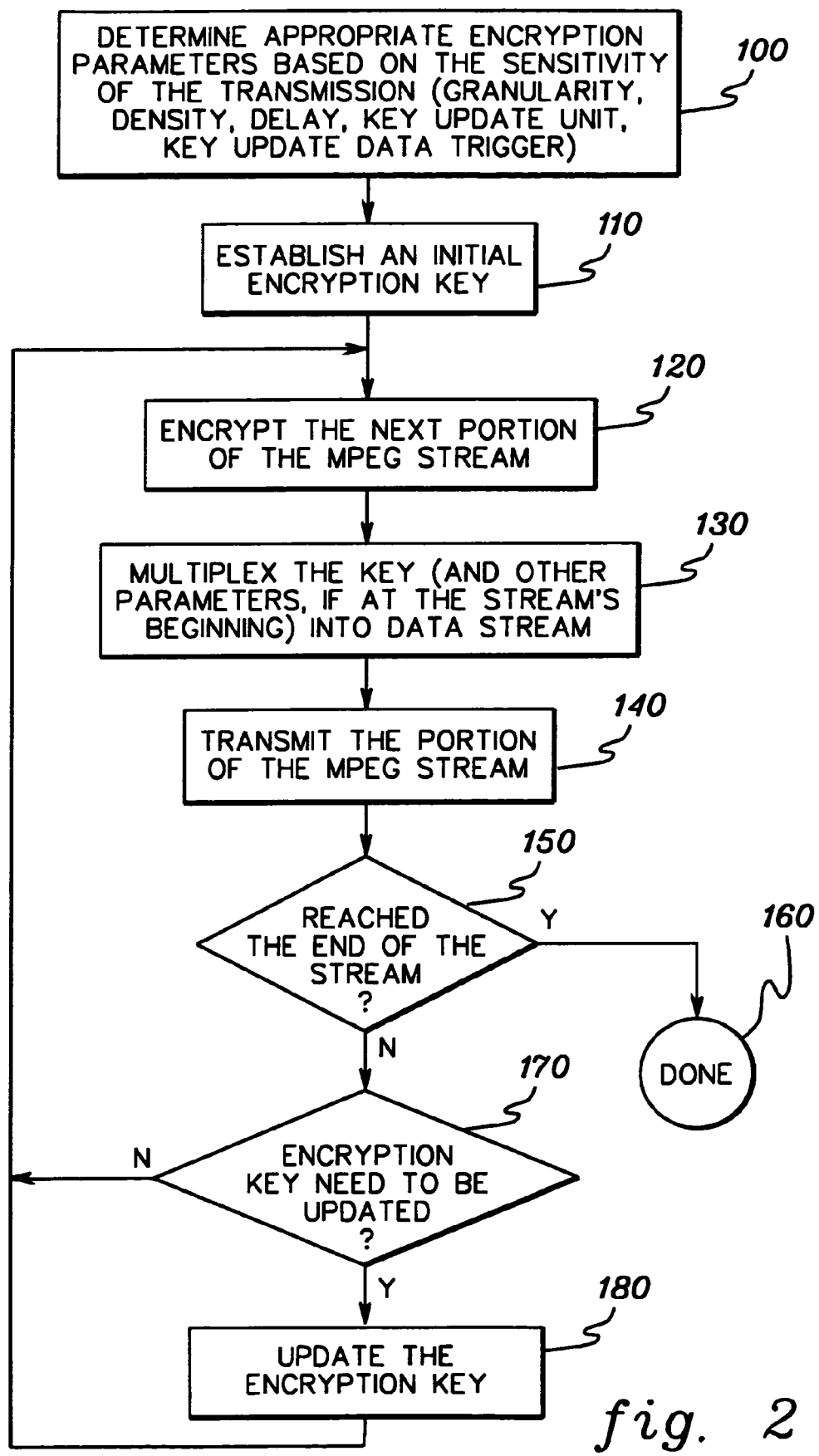
FIG. 2 is a flowchart of one embodiment for implementing dynamic encryption in accordance with the principles of the present invention by varying an encryption key from a set of established encryption parameters.

FIG. 2 is a flowchart of one embodiment of a dynamic encryption routine in accordance with the principles of the present invention. Processing begins by determining appropriate encryption parameters based on sensitivity of the transmitted data 100. As one example, the set of encryption parameters may include encryption granularity, density, delay, key update unit, and key update data trigger, as the terms are defined herein. An initial encryption key is established 110 and a first or next portion of the MPEG data stream is encrypted 120 using the encryption parameters and key. Assuming the existence of a system such as depicted in FIG. 1, the key (and other parameters if at the stream's beginning) is multiplexed into the data stream 130 and transmitted 140 to a receiver. Processing then determines whether the end of the stream has been reached 150, and if so, dynamic encryption processing is complete 160. Otherwise, processing determines whether the encryption key needs to be updated 170. If yes, then the encryption key is updated 180 and processing encrypts the next portion of the MPEG stream 120.

Note that, while decryption may be performed entirely independently of and before MPEG decoding (as depicted in FIG. 1), the decryption unit and MPEG decoder may be integrated as a single unit. Such a discrete unit could be designed to function properly for "normal" (i.e., unencrypted) MPEG streams, but to recognize encrypted streams and to decrypt them before decoding is performed.

Note also, that in the case in which a key varies according to content of the transmission, or according to events in a transmission, a data error or loss can have consequences since not only is a portion of the compressed MPEG data potentially in error, but the decryption mechanism may now be out of synchronization with the transmitter's encrypter. One mechanism for dealing with such a problem is to return to using the initial key at a certain predefined interval (similar to the MPEG notion of sequence headers). For example, at every sequence header, or every GOP, the encrypter and decrypter both return to using the initial key, which evolves from there. This means that a data loss or error would be limited to affecting only that sequence or group, after which synchronization would be resumed. This would also facilitate random access; that is, jumping from one place in an MPEG stream to another.

Another mechanism, in a scenario in which keys are delivered in the stream itself, is to simply deliver the keys redundantly, that is, more often than they are needed or updated.

A mechanism for determining that encryption/decryption synchronization has been lost might be to place a signal in the first unit of encryption (whether encrypted or not) after a key change. If the decrypter sees such a signal, and has not updated its key since the last such signal, then the decrypter knows that synchronization has been lost. Likewise, if the decrypter updates its key and fails to see such a signal in the next unit of encryption, it also knows that synchronization has been lost, and can take appropriate action (for example, notify the transmitter, or wait for the next point at which the encryption key can be reliably re-established). This would only require the use of a single spare bit in an encryption unit.

When transmitting "elementary" MPEG video data, parameters may, for example, be stored in any combination of the following structures:

One or more "user_data" field(s).

The "copyright_extension" construct, specifically by setting the "copyright_flag" to 0 and using fields "copyright_number_1", "copyright_number_2", and "copyright_number_3".

The "time_code" field in a "group of pictures header" (this field is not used during decoding).

When transmitting MPEG in "program stream" form, parameter data may be conveyed by any of the methods above, or further, in "PES" packets (PES denoting "packetized elementary stream") of a specific type. The content type of PES packets is defined by the PES packet's "stream_id" field. The MPEG 2 specification defines a "stream_id" value denoting a "private_stream_1" packet, and another denoting a "private_stream_2" packet. These types are slightly different, but can contain anything the user wishes. Of course, the more overtly parameters and keys are transmitted, the less overall security.

When transmitting MPEG data in "transport stream" format, parameter data may be conveyed by any of the above methods, or further, such data may be stored as "private_data bytes" in the "adaption_field" structure.

To restate, provided herein is a secure technique for encrypting a digital data stream by dynamically varying one or more encryption parameters employed in encrypting the data. Varying of the encryption parameter(s) is preferably responsive to data content. For example, one trigger might be the passage of a certain number of units, where units are specific to the format in which the data is stored. For a digital stream, units would typically be bits, bytes, words, blocks, etc. (and in the distant future, such units, in a biological computer, would be cells, tissue, organs, organism). Alternatively, the trigger for changing the encryption parameter could be the passage of a certain number of units, where the units are specific to the content of the data. In an MPEG stream, the data represents a program composed of sequences, groups of pictures, pictures, slices, macroblocks. In the case of a book, for example, the data could be said to represent a volume, title(s) within the volume, pages, paragraphs, sentences, words, letters. Thus, a first trigger could depend on the passage of units of physical data, and these physical units would be the same no matter the type of information represented. A second trigger could depend on the passage of conceptual units of data, and these units would generally be specific to the content of the data.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for protecting a stream of data to be transferred between an encryption unit and a decryption unit, said method comprising:
   encrypting the stream of data at said encryption unit for transferring of said encrypted stream of data from said encryption unit to said decryption unit;
   dynamically varying said encrypting of said stream of data at said encryption unit over multiple portions of the stream of data by dynamically changing multiple encryption parameters employed for each portion of the stream of data and signaling said dynamic change in encryption parameters to said decryption unit, said dynamically varying of said multiple encryption parameters employed for each portion of the stream of data being responsive to occurrence of a predefined condition in said stream of data;
   wherein said multiple encryption parameters comprise at least two of an encryption key, an encryption granularity, an encryption density scale, an encryption density, an encryption delay, an encryption key update variable, and an encryption key update data trigger; and
   decrypting said encrypted data at the decryption unit, said decrypting accounting for said dynamic varying of said encrypting by said encryption unit using said dynamically changed, multiple encryption parameters.

2. The method of claim 1, further comprising multiplexing said changed encryption parameters and said encrypted data at a sender prior to transferring thereof to a receiver containing said decryption unit, and demultiplexing said changed encryption parameters and said encrypted data at said receiver.

3. The method of claim 1, wherein said dynamically varying comprises dynamically varying said multiple encryption parameters based on passage of a predefined number of units of physical data or passage of a predefined number of conceptual units of data.

4. The method of claim 1, wherein said stream of data comprises a stream of compressed data, and wherein said method further comprises decompressing said compressed data after said decrypting of said encrypted data by said decryption unit.

5. The method of claim 4, wherein said stream of compressed data comprises one of MPEG encoded video data, MPEG encoded audio data, and Dolby AC-3 audio data.

6. The method of claim 1, further comprising initializing a plurality of encryption parameters based on a sensitivity of said stream of data, said plurality of encryption parameters being employed by said encrypting and wherein said changed multiple encryption parameters of said dynamically varying comprise multiple encryption parameters of said plurality of encryption parameters.

7. The method of claim 1, wherein said stream of data comprises a stream of MPEG compressed data, and said method further comprises setting a plurality of encryption parameters for use by said encrypting based upon sensitivity of said stream of MPEG compressed data, and wherein said changed multiple encryption parameters comprise multiple encryption parameters of said plurality of encryption parameters.

8. The method of claim 1, wherein said dynamically varying comprises dynamically varying said multiple encryption parameters responsive to passage of a predefined number of data bits in said stream of data, or alternatively, responsive to passage of a predefined number of data units in said stream of data, wherein said data units comprise at least one of a program, a sequence, a group of pictures, a picture, a slice, or a macroblock.

9. A system for protecting a stream of data comprising:
   an encryption unit and a decryption unit, the encryption unit encrypting the stream of data for transfer to the decryption unit;
   means for dynamically varying said encrypting of said stream of data by said encryption unit over multiple portions of the stream of data by dynamically changing multiple encryption parameters employed by each portion of the stream of data and signaling said dynamic change in encryption parameters employed by each portion of the stream of data to said decryption unit, said means for dynamically varying being responsive to occurrence of a predefined condition in said stream of data;
   wherein said multiple encryption parameters comprise at least two of an encryption key, an encryption granularity, an encryption density scale, an encryption density, an encryption delay, an encryption key update variable, and an encryption key update data trigger; and
   wherein said decryption unit decrypts said encrypted data, said decrypting accounting for said dynamic varying of said encrypting by said encryption unit using said dynamically changed, multiple encryption parameters.

10. The system of claim 9, wherein said stream of data comprises a stream of digital data.

11. The system of claim 9, wherein said means for dynamically varying comprises means for dynamically varying said multiple encryption parameters based on passage of a predefined number of units of physical data or passage of a predefined number of conceptual units of data.

12. The system of claim 9, further comprising a data multiplexer for multiplexing said changed encryption parameters into said encrypted data for transfer thereof to said decryption unit.

13. The system of claim 9, further comprising means for setting a plurality of encryption parameters based on sensitivity of said stream of data, said plurality of encryption parameters being employed by said encryption unit and wherein said changed multiple encryption parameters comprise encryption parameters of said plurality of encryption parameters.

14. The system of claim 13, wherein said stream of data comprises a stream of compressed data, and wherein said system further comprises a decoder for decompressing said compressed data after decrypting thereof by said decryption unit.

15. The system of claim 14, wherein said stream of compressed data comprises a stream of one of MPEG encoded video data, MPEG encoded audio data, and Dolby AC-3 audio data.

16. The system of claim 9, wherein said means for dynamically varying comprises means for changing said multiple encryption parameters based on a predefined number of bits being encoded by said encryption unit, or alternatively, based on a predefined number of units being encoded by said encryption unit, said units comprising one of a program, a sequence, a group of pictures, a picture, a slice, or a macroblock.

17. A system for protecting a stream of data to be transferred between a sender and a receiver, said system comprising:
   an encryption unit disposed at said sender for encrypting the stream of data prior to transfer to said receiver, said encryption unit being adapted to dynamically vary encrypting of the stream of data over multiple portions of the stream of data by dynamically changing multiple encryption parameters employed for each portion of the stream of data based on an occurrence of a predefined condition in said data stream and signaling said change in encryption parameters employed for each portion of the stream of data to said receiver;
   wherein said multiple encryption parameters comprise at least two of an encryption key, an encryption granularity, an encryption density scale, an encryption density, an encryption delay, an encryption key update variable, and an encryption key update data trigger; and
   a decryption unit disposed at said receiver for decrypting said encrypted data, said decryption unit being adapted to receive said changed encryption parameters to account for said dynamic varying of said encrypting by said encryption unit using said changed encryption parameters.

18. At least one program storage device readable by a machine, tangibly embodying at least one program of instructions executable by the machine to perform a method for protecting a stream of data to be transferred between an encryption unit and a decryption unit, comprising:
   encrypting the stream of data at said encryption unit for transfer thereof to said decryption unit;
   dynamically varying said encrypting of said stream of data at said encryption unit over multiple portions of the stream of data by dynamically changing multiple encryption parameters employed for each portion of the stream of data and signaling said change in encryption parameters to said decryption unit, wherein said dynamically varying of said multiple encryption parameters employed for each portion of the stream of data is responsive to occurrence of a predefined condition in said stream of data;
   wherein said multiple encryption parameters comprise at least two of an encryption key, an encryption granularity, an encryption density scale, an encryption density, an encryption delay, an encryption key update variable, and an encryption key update data trigger; and
   decrypting said encrypted data at the decryption unit, said decrypting accounting for said dynamic varying of said encrypting by said encryption unit using said dynamically changed, multiple encryption parameters.

19. The at least one program storage device of claim 18, wherein said method further comprises multiplexing said changed encryption parameters and said encrypted data at a sender prior to transferring thereof to a receiver containing said decryption unit, and demultiplexing said changed encryption parameters and said encrypted data at said receiver.

20. The at least one program storage device of claim 18, wherein said dynamically varying comprises dynamically varying said multiple encryption parameters based on passage of a predefined number of units of physical data or passage of a predefined number of conceptual units of data.

21. The at least one program storage device of claim 18, wherein said stream of data comprises a stream of compressed data, and wherein said method further comprises decompressing said compressed data after said decrypting of said encrypted data by said decryption unit.

22. The at least one program storage device of claim 21, wherein said stream of compressed data comprises one of MPEG encoded video data, MPEG encoded audio data, and Dolby AC-3 audio data.

23. The at least one program storage device of claim 18, wherein said method further comprises initializing a plurality of encryption parameters based on sensitivity of said stream of data, said plurality of encryption parameters being employed by said encrypting and wherein said changed multiple encryption parameters of said dynamically varying comprise multiple encryption parameters of said plurality of encryption parameters.

24. The at least one program storage device of claim 18, wherein said stream of data comprises a stream of MPEG compressed data, and said method further comprises setting a plurality of encryption parameters for use by said encrypting based upon sensitivity of said stream of MPEG compressed data, and wherein said changed multiple encryption parameters comprise multiple encryption parameters of said plurality of encryption parameters.

* * * * *